Patented Nov. 12, 1940

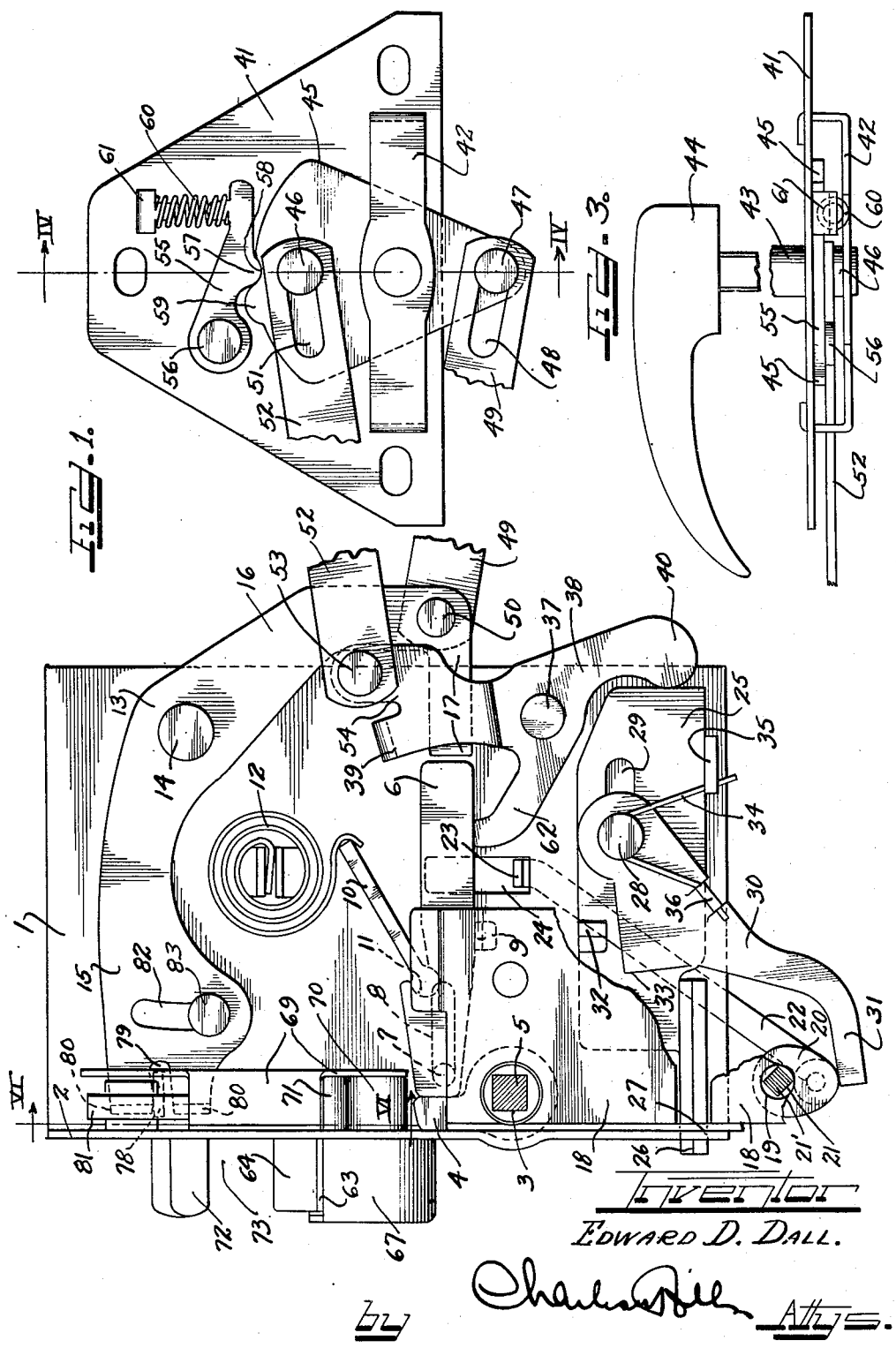

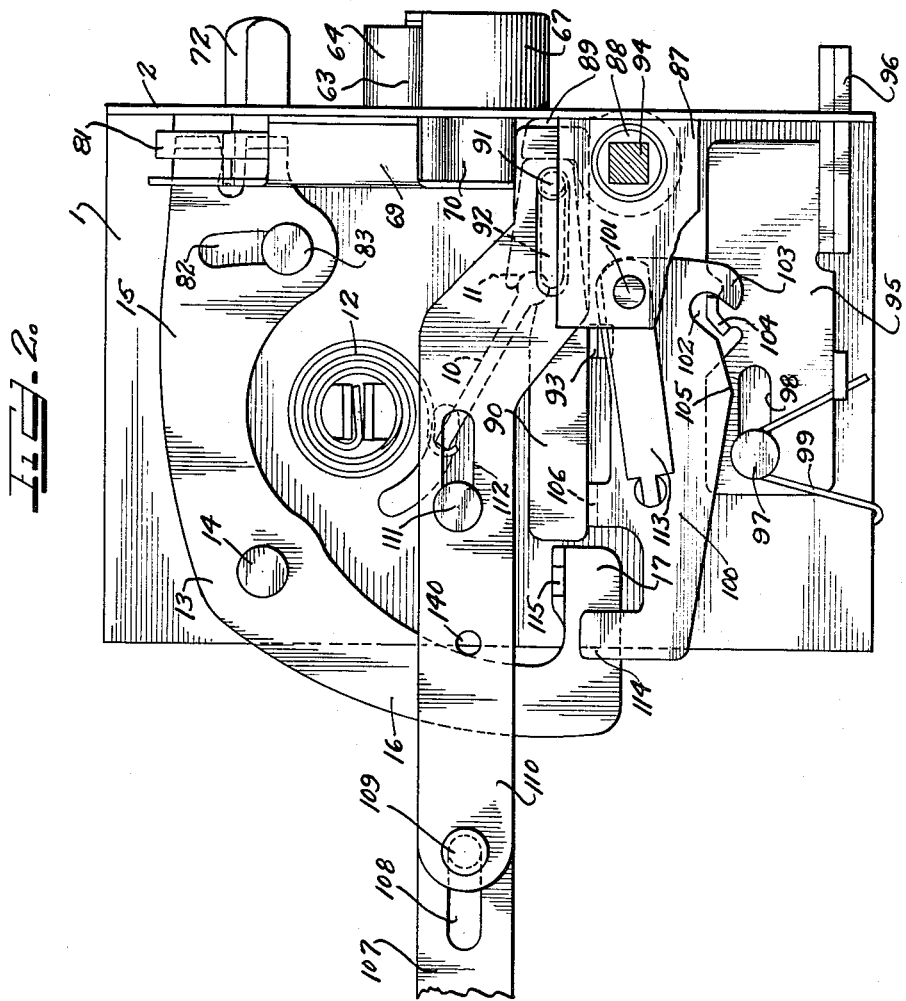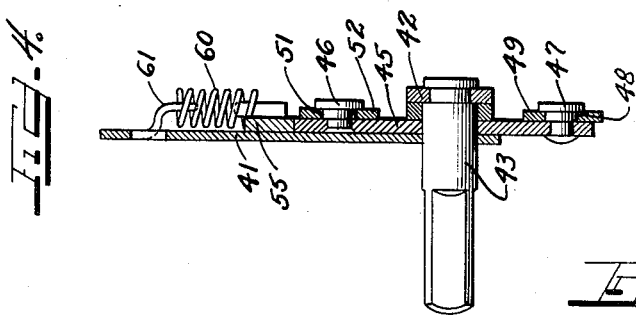

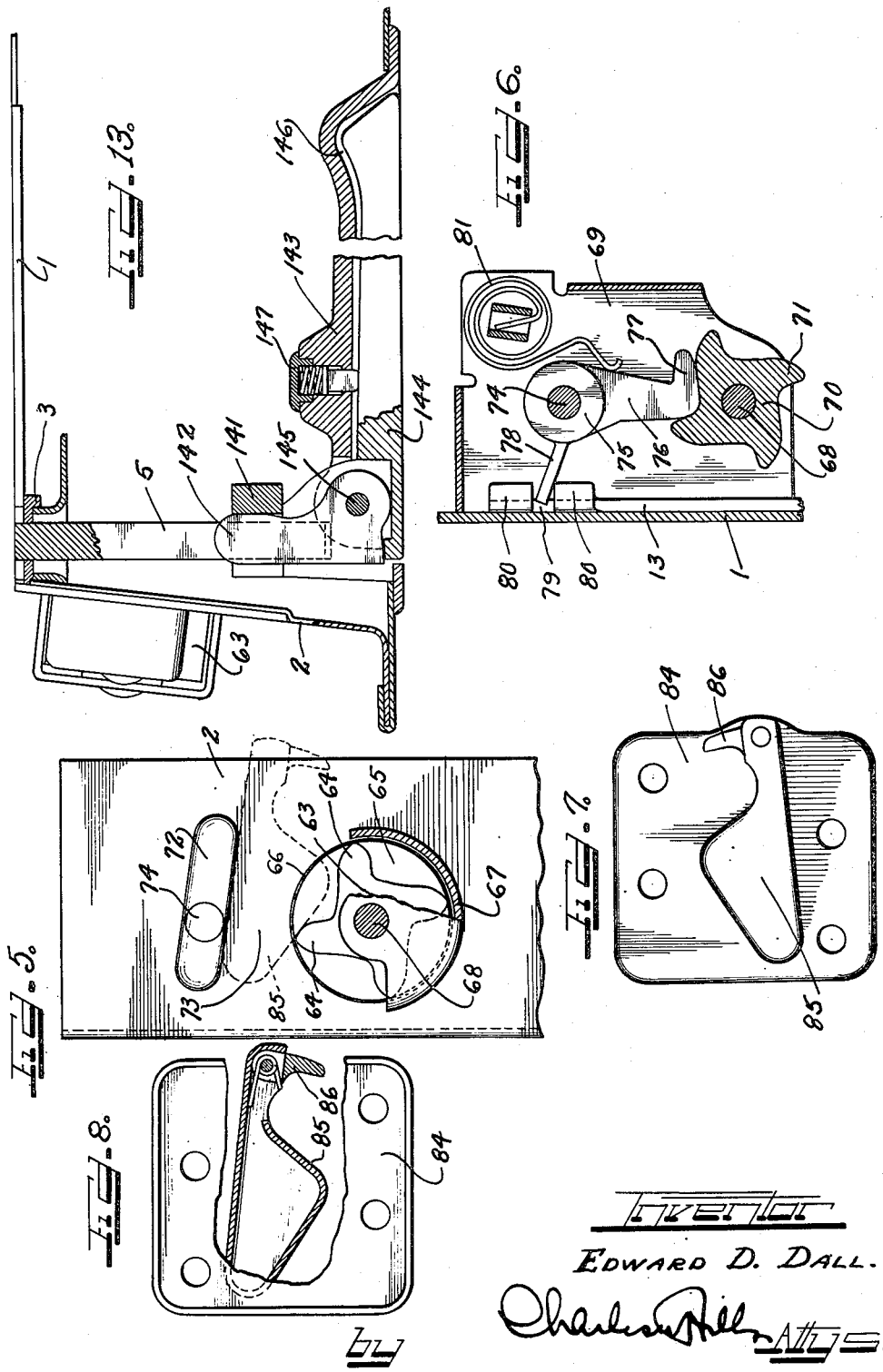

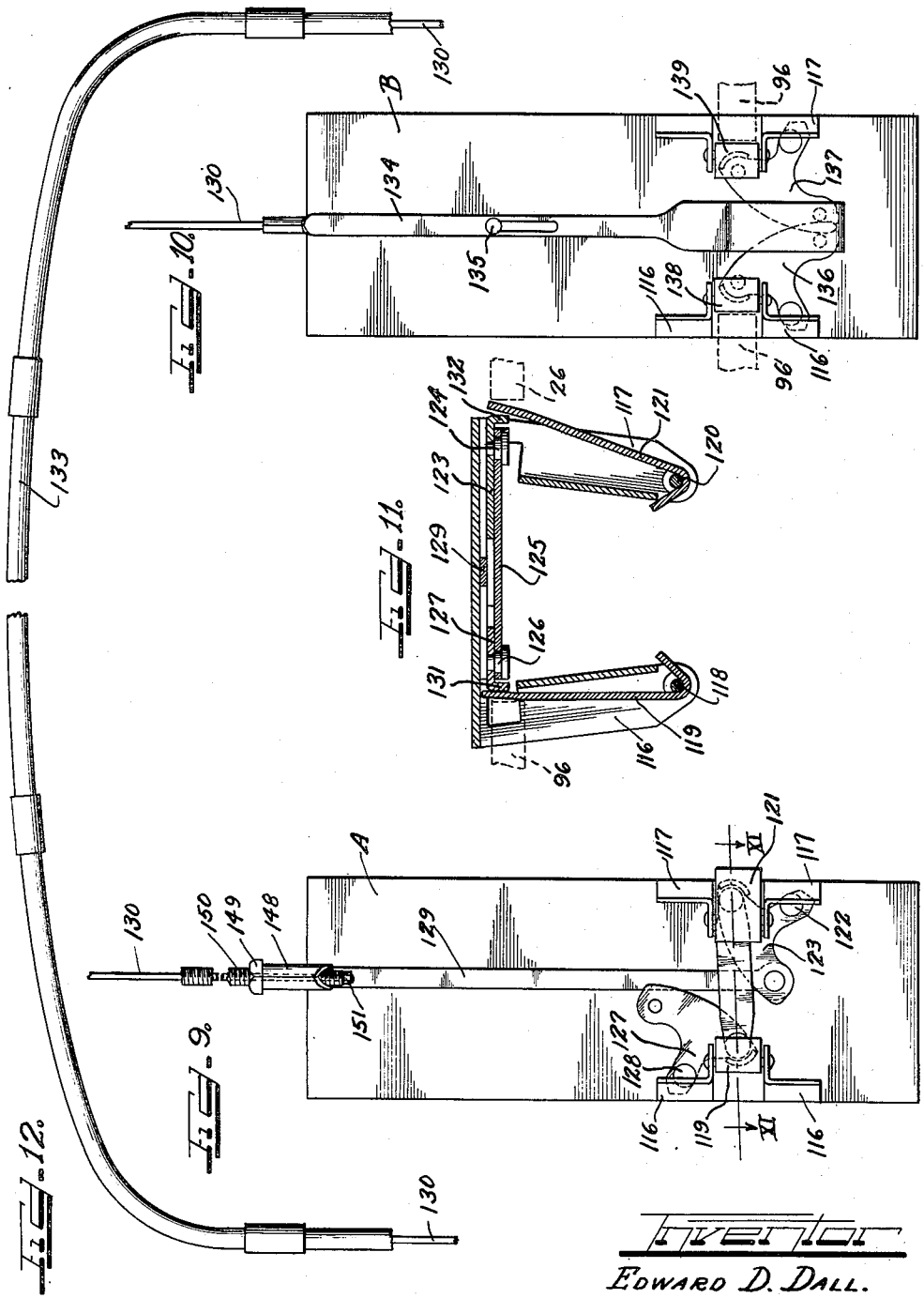

2,221,181

UNITED STATES PATENT OFFICE 2,221,181

AUTOMOBILE DOOR LOCKING MECHANISM

Edward D. Dall, North Chicago, Ill., assignor to Walter F. Wright, Cleveland, Ohio Application November 15, 1937, Serial No. 174,545

9 Claims. (Cl. 70—264)

My invention relates to automobile door locking mechanism and covers improved construction and arrangement of the locks of the various doors of an automobile, improved interconnection of the locks, and improved control of the locks by a master lock on one of the doors.

An important object of the invention is to utilize rotary latching elements, and improved structure for control of such latching elements either by the outside handles or the inside handles of the doors.

A further object is to provide means in the master lock normally operable by forward rotation of the master lock door handle to effect unlatching of the door, together with separate means, preferably operable by a key, to free the handle from the latching mechanism to prevent unlatching of the door by rotation of the handle, and locking means, operable by the handle when freed from the latching mechanism, to be actuated by forward rotation of the handle to effect locking of the other doors.

A further object is to provide lock structure with which either the ordinary type of handle may be used or the flush type of handle may be used.

The above enumerated and other features of the invention are fully described in the following specification in connection with the drawings, in which drawings:

Figure 1 is the outer side elevation of the master lock, and the inside handle mechanism associated therewith;

Figure 2 is an outside elevation of one of the remote locks for cooperation with and control by the master lock;

Figure 3 is a top view of the inside handle mechanism for the master lock door;

Figure 4 is a section on plane IV—IV Figure 1;

Figure 5 is a front end view of the master lock;

Figure 6 is a section on plane VI—VI Figure 1;

Figure 7 is a plan view of a striker plate;

Figure 8 is a rear view of the striker plate partly broken away;

Figure 9 is a front elevation of the stile plate between the master lock door and the adjacent door at one side of an automobile;

Figure 10 is a front elevation of the stile plate between the doors on the oppoosite side of the automobile;

Figure 11 is an enlarged section on plane XI—XI Figure 9;

Figure 12 is a side elevation of cable structure for connecting the stile plate structures; and Figure 13 is a top view, partly in section, of a lock with a flush type handle.

The master lock shown on Figure 1 comprises a supporting plate 1 having the outer flange 2 thereon. Journalled on the plate 1 adjacent to the flange 2 is a rollback member 3 whose arm 4 extends upwardly and normally in engagement with the flange 2, the rollback member being mounted on a shaft 5 which at its outer end carries the outside door handle (not shown) but which would extend toward the right, Figure 1, so that swing of the handle in a vertical plane will turn the rollback member. A transmission or retractor element in the form of a bar or link 6 has a pin 7 extending from its outer end and through a horizontally extending guide slot 8 in the plate 1, a projection 9 from the plate 1 forming a support rest for the bar when in its normal position in which it extends substantially horizontally inwardly. A strut 10 engages at its outer end in the abutment notch 11 in the bar 6, the outer end of the strut being engaged by a spring 12 so that the bar 6 is normally yieldably held shifted outwardly against the inner side of the rollback arm 4 and so that turning of the shaft 5 by a downward swing of its handle will turn the rollback member in clockwise direction for inward shift of the bar 6.

Near the upper end of the plate 1, an angle shaped lever 13 is pivoted on the plate as by means of a pin or stud 14. The outwardly extending leg 15 of the lever has connection with rotary latching mechanism which will be described in detail later. The depending leg 16 of the lever has the outwardly extending end 17 which is in alignment with the transmission bar 6 when this bar is in its normal position.

An auxiliary plate 18 is set forwardly a distance on the plate 1 and is secured to the plate 1 and to the flange 2. The lower end of this auxiliary plate extends a distance below the main plate 1 a hub 19 being journaled in the extension and supports a crank or cam arm 20 which engages against the rear side of the plate extension, the hub having a square opening 21 for receiving a stem 21' which at its outer end may support a lock (not shown), preferably of the cylinder type and operable by a key from the outside of the door for turning of the crank or cam arm 20, this arm normally extending downwardly. A link 22 is pivoted to the end of the arm 20 and extends upwardly behind the main plate 1 and at its upper end has the forward deflection 23 extending through the guide slot 24 in the plate 1, and across which slot the transmission or retractor bar 6 extends. When the crank arm is in its down position, the link end 23 will be at the bottom of the slot away from the bar 6, but when the crank arm 20 is turned in counterclockwise direction, the link 22 will be raised for engagement of its end 23 with the bar 6 to swing this bar upwardly with its end out of register with the end 17 of the latch mechanism controlling lever 13 so that, when the door handle is swung for turning of the rollback 3 while the bar 6 is swung upwardly, the bar cannot engage with the end 17 of the lever 13 and the door cannot be unlatched. In other words the door handle is freed from the latching mechanism and swing of the door handle cannot unlatch the door. When the crank arm 20 is swung down to its normal position, the link 22 will be retracted and the spring 12 may function to return the transmission bar 6 to its normal position in register with the lever end 17 so that the door may then be unlatched by swing of the door handle.

The inward shifting movement of the bar 6 by the rollback while the bar is held out of range of the latching mechanism for the door, is utilized for actuating a train of cooperating elements for setting the locks on the other doors against unlatching by their respective outside handles. Slidable horizontally on the lower part of the frame plate 1 is the plate 25 from whose lower outer corner extends the setting bar or finger 26 and engages in the passageway 27 provided in the flange 2 of the lock frame. The engagement of the bar in the passage guides the plate 25, and the plate is further guided by a stud 28 extending forwardly from the supporting plate 1 through the slot 29 in the plate 25.

Pivoted at its upper end in front of the plate 25 on the stud 28, is a latching lever 30 whose lower end 31 is below the hub 19 and in the path of the end of the crank or cam arm 20 on the hub. At its upper edge the plate 25 has a forward deflection 32 forming an abutment for the outer edge 33 of the lever 25. A spring 34 is coiled around the stud 28 and has one leg engaging the abutment 35 on the plate 25 and its other leg abutting the extension 36 on the latching lever 30, the spring tending to shift the plate 25 inwardly and to swing the latching plate 30 upwardly. Normally, when the crank or cam arm 20 of the key operable mechanism is in its downward extending position, it holds the latching lever 30 down with its upper edge below the abutment 32 on the plate 25, the plate 25 with its bar 26 being normally in inner position and held in such position by the spring 34. Upon turning of the key for swing of the cam or crank arm in counterclockwise direction, the crank arm releases the lever 30 for upward swing by the spring 34 and with its upper edge against the abutment 32 on the plate 25. Further rotation of the crank or cam lever 20 will then raise the link 22 for swing of the transmitter or retractor bar 6 to locking position as has already been explained.

A stud 37 extending forwardly from the supporting plate 1 at a point between the locking plate 25 and the bar 6 pivots a lever 38 whose upper portion is deflected forwardly to be in front of the end 17 of the lever 13 and terminates in an abutment 39 at its upper end which will be in the path of the transmitter bar 6 when it has been raised by the link 22 so that when the lock handle is turned the bar 6 will engage with the abutment to rotate the lever 38 in clockwise direction, the lower end 40 of the lever then abutting the inner end of the plate 25 so that the plate 25 will be shifted outwardly to shift the setting bar 26 outwardly through the passageway 27. This outward movement of the setting bar or finger 26 will, through interconnecting means to be described later, effect setting in the locks on remote doors to prevent unlatching of said doors by their respective handles.

When the plate 25 is shifted outwardly by the lever 38, the abutment 32 is moved to a position in front of the outer end 33 of the latching lever 30 and the lever is then swung upwardly by the spring 34 to position its front end behind the abutment 32 so as to latch the plate 25 and the setting bar 26 in the outer or projected position for maintaining locking of the remote doors.

When the key is turned for swing of the crank or cam arm 20 back to its normal position, the link 22 will first be moved downwardly to release the transmitter bar 6 for return thereof to normal position by the spring 12, and then the latch lever 30 will be swung back to normal for withdrawal of its end 33 from behind the lug 32 so that the spring 34 may then shift back the plate 25 and the setting bar 26 to release the locks on the remote doors from locked condition so that these doors may then be unlatched by swing of their respective handles. Thus, by turning of the cam arm 20 back to normal position, the master lock is first unlocked and then, if it is desired to also unlock the remote doors, the crank arm 20 is fully returned to its normal position for unlatching of the setting plate 25 and the bar 26.

The inside handle mechanism associated with the master lock is shown on Figures 1, 3 and 4. The mechanism comprises a supporting plate 41 secured on the door body. A bearing strap 42 is secured against the front part of the plate 41, and the plate and strap journal the shank or shaft 43 of the inside door handle 44. A triangular shaped lever plate 45 is secured to the shaft 43 between the plate and the strap. At its upper end the lever plate has the stud 46 extending forwardly therefrom and at its apex end the lever plate has the stud 47 extending forwardly therefrom. The stud 47 extends through a longitudinally extending slot 48 in the link bar 49 which at its outer end is pivoted by a pin 50 to the lower end of the leg 16 of the latch mechanism controlling lever 13 in the master lock. The stud 46 extends through the longitudinally extending slot 51 in the link bar 52 which at its outer end is pivoted by a pin 53 to the arm 54 at the upper end of the lever plate 38 and inwardly of the lever plate abutment 39.

Above the lever plate 45 a pawl 55 is pivoted on a stud 56 extending forwardly from the plate 41, the pawl having a tooth 57 for normally engaging in the notch 58 in the arcuate upper edge of the lever plate 45 for holding the inside handle in its normal position, the lever plate having a hump or tooth 59 to the left of the notch behind which the pawl tooth engages when the lever plate has been swung in clockwise direction. A spring 60 extending between the free end of the pawl and an abutment 61 secured to the supporting plate 41 tends to hold the pawl tooth against the lever plate 45.

When the handle 44 is swung down for counterclockwise rotation of the lever plate 45, the stud 47 will pull the link bar 49 for swing of the lever 13 in the master lock and unlatching of the door, the stud 46 during such movement traveling through the slot 51 in the link bar 52 without moving this bar. The door will thus be unlatched by downward swing of the handle 44.

When the handle 44 is swung upwardly for clockwise rotation of the lever plate 45, the stud 46 will pull the link 52 for clockwise rotation of the lever 38 in the master lock so that the setting plate 25 and the setting bar 26 thereon will be shifted outwardly. At the same time, an arm 62 on the lever 38 will engage with and swing the transmitting bar 6 upwardly to its locking position so that both the master lock door and the other doors will be locked against unlatching by their outside handles. Upon clockwise rotation of the lever plate 45, the pawl tooth 57 will be held behind the plate tooth 59 so that the locking condition will be maintained until the handle 44 is swung downwardly to its normal position. During clockwise rotation of the lever plate 45, the stud 47 travels along the slot 48 in the link bar 49 so that this bar will not be moved.

Figures 5 and 6 show the structure and arrangement of the latching mechanism for the master lock of Figure 1. The rotary latch member is in the form of a hub 63 having latch arms or teeth 64 extending substantially tangentially therefrom, four of said teeth being shown. A circular plate 65 at one side of the hub and teeth engages within a circular opening 66 in the outer wall or flange 2 of the lock supporting structure. A semi-cylindrical shell or cap 67 covers the latch member and is secured to the wall 2, the end wall of the cap forming a bearing for one end of a shaft 68 on which the latch member is secured. Spaced inwardly from and secured to and extending from the wall 2 is the inner wall 69 which forms a bearing for the inner end of the shaft 68. Between the walls 2 and 69 is the detent member 70 having substantially tangentially extending teeth 71. The detent member 70 may be a separate member secured to the shaft 69 or may be integral with the latch member 63 and the circular plate 65.

On the outside of the wall 2 is a guide lug 72 situated above the latching member to leave a guideway 73, the lug being secured in place by a rivet 74 and being further secured as by welding to the wall 2, the rivet 74 extending inwardly to the inner wall 69 and serving to journal the hub 75 of the pawl lever 76 terminating in a shoe 77 for cooperating with the detent teeth on the detent member 70. An arm 78 extends laterally from the pawl hub 75 into a slot 79 and between abutment lugs 80 at the outer end of the lever 13, which lever as before explained is swung in counterclockwise direction (Figure 1) by operation of either the outside or the inside handle of the master lock. A spring 81 supported on the wall 69 bears against the pawl lever 76 to normally hold it against the detent member 70 to resist rotation thereof and thereby resist rotation of the latch member 63. The movement of the lever 13 is limited by the length of the slot 82 through which the abutment stud 83 extends from the plate 1, the spring 81 (Figure 6) tending to hold the pawl lever 76 in its normal position to lock the latch element 63 against counterclockwise rotation, the arm 78 on the pawl hub then holding the lever 13 in its normal position with the lower end of the lever slot 82 abutting the stud 83.

Figures 7 and 8 show the striker plate 84 which cooperates with the latching member 63. The plate 84 carries the striker lug 85 which may be integral with the plate and deflected therefrom when the plate is of sheet metal. The striker plates are fastened to the stiles or pillars between doors, and Figure 8 shows the striker plate for the master door lock (Fig. 5) located with its striker lug in position to be received within the passageway 73 when the door is closed. As the door is being closed, the upwardly extending tooth 64 of the latch member 63 encounters the striker lug 85 and the latch member is rotated clockwise against the resistance of the spring pressed pawl lever which engages the detent element 70. When the door is fully closed, the latch member and detent member will have been rotated 90° with the pawl lever then in engagement with the next detent tooth and with the next latch member tooth behind the peak of the striker lug, the striker lug being then in position between the vertical latch tooth and the guide lug 72 as shown by dotted lines, Figure 5, and as the pawl lever 76 will prevent counterclockwise rotation of the detent element 70, the latch element 63 is locked against counterclockwise rotation so that the door cannot be opened until the latch element is released. Such release is effected by counterclockwise rotation of the lever 13 in the lock, such movement swinging the pawl lever 76 inwardly away from the detent element 70 to release the latch element 63 will be released for rotation so that the door may be swung open.

A safety catch 86 is provided and pivoted at the outer end of the striker lug, this safety catch wiping past the vertical tooth of the latching element 63 when the door is moved toward closed position, and if the door is not fully closed the safety catch will engage behind the tooth to prevent the door from swinging open. Upon complete closing of the door, the latch element tooth will cooperate with the striker lug for fully latching of the door as has been just explained above.

The construction and arrangement of the locks for the remote doors are shown on Figure 2. Like the master lock, each remote lock has the main supporting wall 1 with the outer flange 2, the latching controlling lever 13 with its outwardly and downwardly extending legs 15 and 16 respectively, and the rotary latching element 63 and its cooperating and controlling mechanism within the housing 69.

Located between the wall 1 and a cover plate 87 is the rollback member 88 having the upwardly extending arm 89 for engaging the transmission or retractor bar 90 mounted on a pin 91 guided in the slot 92 in the wall 1, the retractor bar normally resting on its supporting ledge 93 in register with the outwardly extending lower end 17 of the lever 13 so that when the handle (not shown) on the shaft 94 of the rollback is swung down, the corresponding outward shift of the retractor bar 90 will rotate the lever 13 for release of the latching mechanism so that the door may be opened.

At the lower part of the lock is the setting plate 95 having the setting bar or finger 96 projecting therefrom through the wall 2 and a distance outwardly from the wall. The plate is guided by the bar 96 and also by a stud 97 extending through the guide slot 98 in the plate, a spring 99 anchored to the stud 97 tending to shift the plate 95 outwardly for projection of the outer end of the setting bar 96 beyond the wall 2, the outward shift of the plate being limited by the engagement of the inner end of the slot 98 with the stud 97.

A setting lever 100 is pivoted at its outer end by a pin 101 extending between the wall 1 and the cover plate 87, this lever being in front of the setting plate 95. In its lower edge and at the outer end thereof, the lever has the notch 102 to leave a contact arm or abutment 103 engageable by the abutment 104 extending forwardly from the upper edge of the setting plate 95. Rearwardly of the notch 102 the lower edge of the lever 100 presents a cam surface 105 with which the abutment 104 engages when the setting plate 95 is shifted inwardly, so that the lever 100 will then be swung upwardly. At its upper edge, adjacent to the end of the retractor bar 90, the lever 100 is deflected rearwardly to provide a lip 106 for engaging with the lower edge of the retractor bar so that the bar will be swung upwardly when the lever 100 is swung upwardly by engagement of the abutment 104 of the plate 95 with the cam surface 105 on the lever, the retractor bar when swung upwardly being out of range of the end 17 of the latching controlling lever 13 so that this lever cannot be rotated when the latch bar is shifted inwardly with the swing of the door handle, so that the door will remain latched in closed position.

The inside handle mechanism for the remote lock is not shown but such mechanism may be of the ordinary type comprising a lever on the inside handle shaft and with the lever connected by a link bar 107 with the door lock structure. As shown in Figure 2 the link has the slot 108 receiving the stud 109 at the inner end of a bar 110 extending into the door lock and engaging at its end with the pin 91 which pivots the retractor bar 90 so that, when the lock is in its normal position and the bar 110 is pulled inwardly by the inside handle, the latch bar 90 will be shifted for engagement with the lever 13 and rotation of the lever to release the rotary latch member 63 so that the door may be swung open. The bar 110 is guided by a stud 111 engaging in the slot 112 in the bar.

The lever 100 has sufficient clearance engagement on the pin 101 so that the lever may swing forwardly a distance sufficient to withdraw its abutment lip 106 from the retractor bar 90 when the lever is held in its upward position while the plate 95 is in its inner position. A spring 113 tends to hold the lever 100 in its rear or normal position. At its inner end, the lever 100 has the upstanding arm 114 which, when the lever is in its up position, will be in the path of a cam projection 115 on the end 17 of the lever 13, so that when the lever 13 is swung in clockwise direction the lever 100 will be swung forwardly for release of the retractor bar 90 so that the spring 12 may restore the retractor bar to its normal position against the rest projection 93. The purpose of this arrangement will be referred to more in detail later.

The mechanism for connecting the master lock with the remote door locks is shown on Figures 9 to 12. The master lock is usually on the right front door of an automobile and Figure 9 shows the transmission mechanism on the stile or post between the master lock door and the right rear door, while Figure 10 shows the transmission mechanism in the stile or post between the front and rear doors on the left side of the automobile.

The transmission mechanism for the master lock comprises a supporting plate A having forwardly extending upper and lower supporting brackets 116 on one side and corresponding brackets 117 at the opposite side. A pin 118 extending between the front ends of the brackets 116 hinges a striker lever 119, and the brackets 117 hinge a pin 120 for the striker lever 121. Pivoted on the plate A by a pin 122 adjacent to the lower bracket 117 is a T-shaped lever 123 pivoted at its outer end by a pin 124 to the adjacent end of a transmisison bar 125. At its other end, the bar 125 is pivoted by a pin 126 to the lower end of the lever 127 pivoted at 128 to the plate A at a point adjacent to the upper bracket 116. The lower end of the lever 123 is pivoted to the lower end of a rod 129 extending upwardly to receive a cable 130. Adjacent to the ends of the transmission bar 125, the levers 123 and 127 have arcuate abutments or flanges 131 and 132 against which the rear ends of the striker levers 119 and 121 engage. As shown by Figures 9 and 11, the arrangement on the transmission structure between the master lock door and the adjacent side door is such that the striker lever 119 is in its inner position and the lever 121 is in its outer position, the lever 121 being in the path of the setting bar 26 of the master lock and the lever 119 being in front of the end of the projected setting bar 96 of the adjacent door lock when the doors are in closed position and the latch mechanisms free to be operated by the respective outside handles for the doors. When the outside handle on the master lock is swung down for engagement of the retractor bar 6 with the lever 38 for outward shift of the setting plate 25 and the setting bar 26, the bar engages and swings the striker lever 121 inwardly and the lever 123 is swung downwardly and this movement is communicated through the transmission bar 125 to the lever 127 which is also swung downwardly to engage with and swing out the striker lever 119. this resulting in inward shift of the setting bar 96 of the rear side door and upward swing of the setting lever 100 in the lock of said door for upward swing of the retractor bar 90 so that the latch mechanism on the door cannot be released by operation of the outside handle. At the same time, the swing of the lever 123 is communicated to the rod 129 for downward shift thereof and pull on the cable 130. This cable passes through guide tubing 133, which tubing extends along the top of the automobile to the opposite side thereof for connection of the other end of the cable with a rod 134 guided on the plate B as by a pin 135. At its lower end the rod 134 engages levers 136 and 137, the levers being of T-shape and pivoted at their ends adjacent to the lower bracket structures 116 and 117 respectively on the plate B. At their upper ends, these levers are behind the rear ends of the striker levers 138 and 139 respectively, these levers being like those in Figures 9 and 11 but the levers being normaly in their inner position, the projecting ends of the setting bar 96 of the adjacent doors on the left side of the car being in front of the levers as shown by dotted lines, Figure 10. When the cable is pulled and the rod 134 is raised, the levers 136 and 137 will be swung to engage with and swing the striker levers outwardly for inward shift of the setting bars 96 on the locks of the adjacent doors so that the retractor bars in such locks will be raised to prevent actuation of the latching mechanism by the outside handles of said doors. When the setting bar 26 of the master lock is withdrawn, the released setting bars 96 in the locks of the doors will be shifted outwardly by the springs 99, and the pressure of the bars 96 against the striker levers 138 and 139 on the plate B will swing the levers 136 and 137 down to pull on the cable 130 so that the rod 129 on the plate A will be raised to its normal position for swing of the levers 122 and 127 and swing of the striker levers 119 and 121 back to the normal position shown in Figures 9 and 11.

If the remote locks are arranged as shown in Figure 2 where the inside handle actuated bar 110 is connected with the retractor bar 90, and the retractor bar is swung upwardly by inward shift of the setting bar 96, the inside handles are also unable to effect unlatching of the doors.

Instead of the ordinary type of outside handles for the doors, the flush type of handle could be used as shown in Figure 13. The lock structure is substantially the same as that for the ordinary type handle except that the shaft 5 for the rollback 3 has its outer end cut off and provided with a lever 141 engageable by the cam arm 142 mounted on the frame 143 of the flush type handle, the handle 144 being pivoted on the pin 145 which also supports the cam lever 142, latch means (not shown) normally holding the handle within the recess 146 of the frame 143, pushbutton means 147 being provided for swinging the handle a distance forwardly out of the recess so that it may be grasped and swung out further for swing of the cam lever 142 into engagement with the arm 141 for rotation of the shaft 5 and the rollback 3.

Briefly summarizing the operation, the master lock and the other door locks are normally in unlocking position as shown by Figures 1 and 2. If it is desired to lock all of the doors from the outside of the automobile the key is inserted in the lock and turned for counterclockwise rotation of the crank or cam arm 20. During the fore part of the movement of this crank arm, the latch plate 30 is released for operation, and during the last part of the travel of the crank arm, link 22 is raised to swing the retractor bar 6 upwardly away from the latching controlling lever 13 into a position for cooperation with the lever 38. The master lock door is now locked against unlatching by rotation of the rollback by the outside handle, but rotation of the handle and rollback will now result in swing of the lever 38 and outward shift of the setting plate 25 and the setting bar 26, the freed latching plate 30 then engaging behind the setting plate abutment 32 to hold the setting bar 26 out. The outward shift of the setting bar 26 is communicated through the stile mechanisms to the setting bars 96 in the locks on the other doors and in such locks the levers 100 are swung upwardly for swing of the retractor bars 90 away from the latching controlling levers 13 so that the doors cannot be unlatched by swing of the door outside handles.

To unlock the system, the key of the master lock is turned for clockwise rotation of the cam arm 20 and during the forepart of this movement the link 22 is drawn down to release the retractor bar 6 so that the master lock will be unlocked and then during final movement of the cam arm the latching plate 30 will be withdrawn from the setting plate 25 so that the spring 34 may shift the setting plate and the setting bar 26 back to their inner position. Such inward shift of the setting bar 26 of the master lock away from the transmission mechanism in the stiles will release the setting bars 96 of the locks on the other doors and the springs 99 on such doors will shift the setting plates 95 outwardly for downward swing of the levers 100 and release of the retractor bars for return to normal position so that such doors may then be unlatched by swing of the outside handles.

When the doors are all closed and latched, and it is desired to open the master lock door from within the car, the inside handle on the door is swung down for rotation of the cam plate 45 to pull the link bar 49 for swing of the lever 13 to release the latch mechanism so that the door may then be swung open. To lock the system from the inside, the inside handle of the master lock door is swung upwardly for rotation of the lever plate 45 for pull of the link bar 52 and swing of the lever 38 in the master lock, the arm 62 of the lever 38 then raising the retractor bar 6 to its locking position and at the same time causing the setting plate 25 and the setting bar 26 to be shifted outwardly for inward shift of the setting bars 96 at the locks of the other doors for raising of the retractor bars of such locks to thereby lock such doors against unlatching by their outside handles. The setting of the inside handle of the master lock door for locking of all of the doors will be yieldably maintained by the spring pressed pawl 56 engaging with its tooth 57 behind the detent tooth 59 on the lever plate 45. To unlock the doors, the inside handle 44 is swung downwardly back to its normal position for release of the lever plate 45 from the pawl 55 whereupon the lever 38 is restored to normal position for release of the tractor bar 6 of the master lock and release of the setting bar 26 so that the springs in the locks of the other doors may restore the settings to normal position for release of the retractor bars to door unlatching position.

Referring to Figure 2, when the bars 110 at the locks of the doors remote from the master lock door are free of the latch mechanism controlling levers 13, then when all the doors are locked from the master lock, the raised retractor bars 90 at the locks of the remote doors will prevent unlatching of such doors by their inside handles. This arrangement would be used where it is desirable to prevent passengers from leaving the car.

Means are provided for adjusting the length of the cable 130. As shown by Figure 9, the rod 129 terminates in a sleeve 148. The sleeve is threaded for receiving a threaded tube 150 through which the end of the cable passes to be secured at its end to an abutment ball or block 151, a lock nut 149 holding the tube in adjusted position. Upon turning of the threaded sleeve 150 to exert pressure against the block 151, the cable will be shortened and if the threaded tube is turned in the opposite direction the cable will be slackened or lengthened. The cable is always pulled and never pushed.

It is evident that the door handle actuating mechanism shown may be associated with the ordinary type of longitudinally shiftable latch bolt instead of the rotary type of latch member shown.

I have shown practical and efficient embodiments of the various features of my invention but I do not desire to be limited to the exact construction, arrangement and operation shown and described as changes and modifications may be made without departing from the scope of the invention.

I claim as follows:

1. The combination with the doors of an automobile, of a master lock on one of said doors, locks on the other doors, latch means for each of said doors for holding it closed and an outside handle for each door, means at each of said other door locks for normally enabling the handle to operate the latch means for unlatching of the door, a transmission element in the master lock normally in position for actuation of the latching means for unlatching of the door upon rotation of the lock handle, locking means operable by a key for moving said transmission element into another position for preventing unlatching of the door by the handle and whereby said master lock door will be locked, locking controlling mechanism in said master lock operable upon turning of said handle when said transmission element is in its other position, and means for transmitting the movement of said locking controlling mechanism to said remote door locks for rendering the handles of said other door locks incapable of unlatching said doors.

2. In automobile door locking mechanism, a lock on one of the doors, latch mechanism on said lock for holding the door closed, a handle for the door, a transmission element operable in either of two positions by the rotation of said handle, said transmission element in one position serving to transmit rotation of the handle to the latching mechanism for unlatching of said door, means independent of said handle for setting said transmission element to its other position in which rotation of the handle is ineffective to unlatch the latching mechanism, locking controlling mechanism actuated when said handle operates said transmission element while in its other position, lock and latch mechanisms for the other doors, and means operated by the actuated controlling mechanism to prevent unlatching of said other doors.

3. In automobile door locking mechanism, a lock on one of the doors, latch mechanism and locking controlling mechanism on said lock, a handle for the door, a transmission element adapted to be set in either one of two positions, means for setting said transmission element, said transmission element when in one set position transmitting rotation of the handle to the latching mechanism for unlatching of the door and when in its other set position being released from said latching mechanism and effective to transmit the rotation of the handle to said locking controlling mechanism for actuation of said locking controlling mechanism.

4. In automobile door locking mechanism, a lock on one of said doors, latching mechanism on said lock for holding the door in closed position, locking controlling mechanism on said lock, a handle for the door, a link normally in position to transmit rotation of the handle to the latching mechanism for unlatching of the door, means for moving said link to another position in which it is incapable of transmitting motion from the handle to the latching mechanism, said link when actuated by said handle in its other position causing operation of said locking controlling mechanism.

5. In automobile door locking mechanism, a lock on one of said doors, latching mechanism on said lock for holding the door in closed position, locking controlling mechanism on said lock, a handle for the door, a link normally in position to transmit rotation of the handle to the latching mechanism for unlatching of the door, means for moving said link to another position in which it is incapable of transmitting motion from the handle to the latching mechanism, said link when actuated by said handle in its other position causing operation of said locking controlling mechanism, and means for transmitting the operation of said locking mechanism to locks on remote doors for locking of said doors.

6. In automobile door locking mechanism, a lock on one of the doors, said lock having latching mechanism for holding the door closed, a handle for said door and a rollback operable thereby, a transmission link shiftable by said rollback, said link being normally in position for actuation by said rollback for operation of said latching mechanism to unlatch the door, means for moving said link into another position in which its movement by said rollback cannot actuate the latching mechanism, and locking controlling mechanism operated by said transmission link when it is moved by said rollback while in said other position.

7. In automobile door locking mechanism, a master lock on one of the doors, locks on the other doors, latching mechanism for each of said doors, an outside handle for each of the doors, means in each lock normally effective to unlatch the latching mechanism upon swing of the respective outside handle, means at the master lock operable independently of the respective outside handle for locking said lock against unlatching, and means operable while said master lock is locked against unlatching for locking the other door locks against unlatching when the outside handle of the master lock is turned.

8. In automobile door locking mechanism, a master lock on one of the doors, locks on the other doors, latching mechanism for each of said doors, an outside handle for each of the doors normally in connection with the latching means for unlatching thereof, a first means at the master lock for freeing the outside handle of said lock from the latching mechanism whereby operation of the handle will be ineffective to cause unlatching, and a second means operable by the freed handle of the master lock for freeing the handles of the other doors from the latching mechanisms.

9. In automobile door locking mechanism, a master lock for one of the doors, locks for the other doors, latching mechanism for each of said doors, an outside handle for each of the doors normally in connection with the latching mechanism for unlatching thereof for opening of the doors, key operable means at the master lock for first freeing the outside handle of said lock from the latching mechanism whereby movement of said handle in unlatching direction will be ineffective to cause unlatching, and means operable by rotation of the master lock handle in unlatching direction after freeing thereof from the latching mechanism for effecting freeing of the handles of the other doors from their latching mechanism.

EDWARD D. DALL.